United States Patent
Sawamura et al.

(10) Patent No.: US 9,656,211 B2
(45) Date of Patent: May 23, 2017

(54) METHOD FOR REGENERATING CARBON DIOXIDE ABSORBING LIQUID IN CARBON DIOXIDE RECOVERY METHOD

(75) Inventors: Ken-ichi Sawamura, Osaka (JP); Suguru Fujita, Osaka (JP); Masanobu Aizawa, Osaka (JP)

(73) Assignee: HITACHI ZOSEN CORPORATION, Osaka (JP)

( * ) Notice: Subject to any disclaimer, the term of this patent is extended or adjusted under 35 U.S.C. 154(b) by 622 days.

(21) Appl. No.: 14/117,161

(22) PCT Filed: May 10, 2012

(86) PCT No.: PCT/JP2012/062031
§ 371 (c)(1),
(2), (4) Date: Jun. 26, 2014

(87) PCT Pub. No.: WO2012/157525
PCT Pub. Date: Nov. 22, 2012

(65) Prior Publication Data
US 2015/0147252 A1    May 28, 2015

(30) Foreign Application Priority Data
May 13, 2011    (JP) ................................ 2011-108548

(51) Int. Cl.
*B01D 53/96*    (2006.01)
*B01D 53/62*    (2006.01)
(Continued)

(52) U.S. Cl.
CPC ......... *B01D 53/96* (2013.01); *B01D 53/1425* (2013.01); *B01D 53/1475* (2013.01);
(Continued)

(58) Field of Classification Search
None
See application file for complete search history.

(56) References Cited

U.S. PATENT DOCUMENTS

| 6,159,542 A * | 12/2000 | Kondo | ............... B01D 67/0051 427/245 |
| 2004/0173094 A1* | 9/2004 | Nakayama | ........... B01D 53/228 95/45 |

(Continued)

FOREIGN PATENT DOCUMENTS

| JP | 03-193116 A | 8/1991 |
| JP | 7-213861 A | 8/1995 |

(Continued)

OTHER PUBLICATIONS

International Search Report dated Jun. 19, 2012, issued for PCT/JP2012/062031.

(Continued)

*Primary Examiner* — Daniel Berns
(74) *Attorney, Agent, or Firm* — Locke Lord LLP; James E. Armstrong, IV; Julie Tabarovsky

(57) ABSTRACT

In a carbon dioxide recovery method including a carbon dioxide absorption step of bringing a gas to be treated containing carbon dioxide into contact with a carbon dioxide absorbing liquid, thereby removing carbon dioxide from the gas to be treated, and a regeneration step of removing carbon dioxide from a rich solution that has absorbed carbon dioxide in the carbon dioxide absorption step, thereby achieving regeneration, the rich solution that has absorbed carbon dioxide is guided in liquid form to a membrane separation apparatus (5) that is selectively permeable to carbon dioxide and equipped with a zeolite membrane for carbon dioxide separation, carbon dioxide is separated and removed by a pervaporation method, and the carbon dioxide absorbing liquid is thus regenerated.

10 Claims, 3 Drawing Sheets

(51) Int. Cl.
*B01D 53/14* (2006.01)
*B01D 61/36* (2006.01)
*B01D 71/02* (2006.01)
*B01D 63/06* (2006.01)

(52) U.S. Cl.
CPC .......... *B01D 53/62* (2013.01); *B01D 61/362* (2013.01); *B01D 63/06* (2013.01); *B01D 71/028* (2013.01); *B01D 2252/20484* (2013.01); *B01D 2256/24* (2013.01); *B01D 2257/504* (2013.01); *B01D 2258/0283* (2013.01); *B01D 2258/05* (2013.01); *B01D 2311/04* (2013.01); *B01D 2311/2626* (2013.01); *B01D 2317/022* (2013.01); *Y02C 10/04* (2013.01); *Y02C 10/06* (2013.01); *Y02P 20/126* (2015.11); *Y02P 20/152* (2015.11)

(56) References Cited

U.S. PATENT DOCUMENTS

2007/0084344 A1  4/2007  Moriya et al.
2010/0229720 A1  9/2010  Sonwane et al.
2011/0000236 A1  1/2011  Seiler et al.

FOREIGN PATENT DOCUMENTS

| JP | 2007-105683 A | 4/2007 |
| JP | 2008-104953 A | 5/2008 |
| JP | 2008-104953 A | 5/2008 |
| JP | 2010-005509 A | 1/2010 |
| JP | 2010-208936 A | 9/2010 |
| WO | WO-2009/097930 A2 | 8/2009 |
| WO | WO2010-044836 A1 | 4/2010 |

OTHER PUBLICATIONS

Official Letter dated Dec. 29, 2014 from the State Intellectual Property Office of the Peoples Republic of China in the Corresponding Chinese Patent Application.

* cited by examiner

__(1)__

METHOD FOR REGENERATING CARBON DIOXIDE ABSORBING LIQUID IN CARBON DIOXIDE RECOVERY METHOD

TECHNICAL FIELD

The present invention relates to a method for regenerating a carbon dioxide absorbing liquid in a carbon dioxide recovery method for separating carbon dioxide from various gases such as combustion exhaust gases, natural gases, biogases, and chemical process gases, for example.

BACKGROUND ART

In recent years, the greenhouse effect of carbon dioxide has been pointed out as one of the causes of the global warming phenomenon, and, across the world, there is an urgent need to take countermeasures for the protection of the global environment.

Conventionally, a method in which a combustion exhaust gas from a boiler, for example, is contacted with an amine-based carbon dioxide absorbing liquid, thereby removing and recovering carbon dioxide from the combustion exhaust gas, has been commonly implemented.

In such a case, conventionally, carbon dioxide has been separated by carbon dioxide absorption and regeneration (carbon dioxide desorption) by a chemical absorption method using an absorbing liquid such as monoethanolamine (MEA) or a sterically hindered amine, for example.

As a process of removing and recovering carbon dioxide from a combustion exhaust gas using an amine-based carbon dioxide absorbing liquid as above, Patent Document 1 below discloses a method in which a combustion exhaust gas is contacted with a carbon dioxide absorbing liquid in an absorption tower, and the absorbing liquid that has absorbed carbon dioxide is heated in a regeneration tower, whereby carbon dioxide is released and, at the same time, the absorbing liquid is regenerated, recirculated through the absorption tower, and reused.

PRIOR ART DOCUMENTS

Patent Documents

Patent Document 1: JP-A-3-193116

SUMMARY OF THE INVENTION

Problems that the Invention is to Solve

However, the above conventional method described in Patent Document 1 has a problem in that in the carbon dioxide separation operation, a large amount of heat energy is required in the process of regenerating an absorbing liquid after the absorption of carbon dioxide, which is the main factor that increases the cost of carbon dioxide separation.

However, under the present circumstances, in large-scale carbon dioxide treatment facilities, the method that uses an amine-based carbon dioxide absorbing liquid is the most popular separation operation, and how to reduce the heat energy required for the regeneration thereof has been one of major challenges in this field. As a solution to such a challenge, it has often been considered to select an absorbing liquid to reduce the reaction heat at the time of the absorption/dissociation of carbon dioxide.

An object of the invention is to solve the problems of the prior art mentioned above and provide a method for regenerating a carbon dioxide absorbing liquid in a carbon dioxide recovery method, according to which in a regeneration step where a rich solution that has absorbed carbon dioxide is regenerated as an absorbing liquid, in an equilibrium reaction (absorption/desorption) state between carbon dioxide and an absorbing liquid, the equilibrium state is transitioned using a membrane separation apparatus equipped with a zeolite membrane to effectively promote the reaction, that is, the so-called membrane reactor function is used, thereby constructing an energy-saving hybrid system that is a combination of a chemical absorption method and a zeolite membrane; as a result, the heat energy required for the regeneration of an absorbing liquid can be reduced, and the cost of carbon dioxide separation and removal can be significantly reduced.

Means for Solving the Problems

For achieving the above object, the invention of claim 1, a method for regenerating a carbon dioxide absorbing liquid in a carbon dioxide recovery method, is characterized in that in a carbon dioxide recovery method including a carbon dioxide absorption step of bringing a gas to be treated containing carbon dioxide into contact with a carbon dioxide absorbing liquid, thereby removing carbon dioxide from the gas to be treated, and a regeneration step of removing carbon dioxide from a rich solution that has absorbed carbon dioxide in the carbon dioxide absorption step, thereby achieving regeneration, the rich solution that has absorbed carbon dioxide is guided in liquid form to a membrane separation apparatus that is selectively permeable to carbon dioxide and equipped with a zeolite membrane for carbon dioxide separation, carbon dioxide is separated and removed by a pervaporation method, and the carbon dioxide absorbing liquid is thus regenerated.

The invention of claim 2 is the method for regenerating a carbon dioxide absorbing liquid in a carbon dioxide recovery method defined in claim 1, characterized in that before the rich solution that has absorbed carbon dioxide is guided in liquid form to the membrane separation apparatus that is selectively permeable to carbon dioxide, in order to separate moisture contained in the rich solution that has absorbed carbon dioxide from the rich solution absorbing liquid, the rich solution is guided in liquid form to a membrane separation apparatus that is selectively permeable to moisture and equipped with a zeolite membrane for moisture separation, and moisture is separated and removed by a pervaporation method.

The invention of claim 3 is the method for regenerating a carbon dioxide absorbing liquid in a carbon dioxide recovery method defined in claim 1, characterized in that for the membrane separation of carbon dioxide by a pervaporation method, a secondary (permeate) side of the membrane separation apparatus equipped with a zeolite membrane for carbon dioxide separation is depressurized.

The invention of claim 4 is the method for regenerating a carbon dioxide absorbing liquid in a carbon dioxide recovery method defined in claim 2, characterized in that for the membrane separation of moisture by a pervaporation method, moisture that has permeated to a secondary (permeate) side of the membrane separation apparatus equipped with a zeolite membrane for moisture separation is condensed by a cooling source to depressurize the secondary (permeate) side of the membrane separation apparatus.

The invention of claim 5 is the method for regenerating a carbon dioxide absorbing liquid in a carbon dioxide recovery method defined in claim 1 or 3, characterized in that as the amount of heat required for the membrane separation of carbon dioxide by a pervaporation method, a hot gas to be treated that is originally to be treated is introduced as a heat source into the membrane separation apparatus equipped with a zeolite membrane for carbon dioxide separation.

The invention of claim 6 is the method for regenerating a carbon dioxide absorbing liquid in a carbon dioxide recovery method defined in claim 2 or 4, characterized in that as the amount of heat required for the membrane separation of moisture by a pervaporation method, a hot gas to be treated that is originally to be treated is introduced as a heat source into the membrane separation apparatus equipped with a zeolite membrane for moisture separation.

The invention of claim 7 is the method for regenerating a carbon dioxide absorbing liquid in a carbon dioxide recovery method defined in claim 5 or 6, characterized in that the membrane separation apparatus is equipped with a flow path for a hot gas to be treated, and a hot gas to be treated that is originally to be treated is received as a heat source in the flow path as the amount of heat required for the membrane separation of carbon dioxide or moisture by a pervaporation method.

Advantage of the Invention

The invention of claim 1, the method for regenerating a carbon dioxide absorbing liquid in a carbon dioxide recovery method, is characterized in that in a carbon dioxide recovery method including a carbon dioxide absorption step of bringing a gas to be treated containing carbon dioxide into contact with a carbon dioxide absorbing liquid, thereby removing carbon dioxide from the gas to be treated, and a regeneration step of removing carbon dioxide from a rich solution that has absorbed carbon dioxide in the carbon dioxide absorption step, thereby achieving regeneration, the rich solution that has absorbed carbon dioxide is guided in liquid form to a membrane separation apparatus that is selectively permeable to carbon dioxide and equipped with a zeolite membrane for carbon dioxide separation, carbon dioxide is separated and removed by a pervaporation method, and the carbon dioxide absorbing liquid is thus regenerated. The invention of claim 1 is advantageous in that in the regeneration step where a rich solution that has absorbed carbon dioxide is regenerated as an absorbing liquid, in an equilibrium reaction (absorption/desorption) state between carbon dioxide and the absorbing liquid, the equilibrium state is transitioned using a membrane separation apparatus equipped with a zeolite membrane to effectively promote the reaction, that is, the so-called membrane reactor function is used, thereby constructing an energy-saving hybrid system that is a combination of a chemical absorption method and a zeolite membrane; as a result, the heat energy required for the regeneration of the absorbing liquid can be reduced, and the cost of carbon dioxide separation and removal can be significantly reduced. In addition, by the transition of the equilibrium state, the temperature at which the absorbing liquid is regenerated can be lowered, and enhancing effects on the durability of the absorbing liquid itself can also be expected.

The invention of claim 2 is the method for regenerating a carbon dioxide absorbing liquid in a carbon dioxide recovery method defined in claim 1, characterized in that before the rich solution that has absorbed carbon dioxide is guided in liquid form to the membrane separation apparatus that is selectively permeable to carbon dioxide, in order to separate moisture contained in the rich solution that has absorbed carbon dioxide from the rich solution absorbing liquid, the rich solution is guided in liquid form to a membrane separation apparatus that is selectively permeable to moisture and equipped with a zeolite membrane for moisture separation, and moisture is separated and removed by a pervaporation method. The invention of claim 2 is advantageous in that at the time of the membrane separation of carbon dioxide by a pervaporation method defined in claim 1, because the presence of moisture is a factor that inhibits the membrane permeation of carbon dioxide, moisture is previously removed before the separation of carbon dioxide; as a result, the carbon dioxide separation performance can be sufficiently exhibited, and also the composition of the absorbing liquid can be stabilized without an increase in moisture content.

The invention of claim 3 is the method for regenerating a carbon dioxide absorbing liquid in a carbon dioxide recovery method defined in claim 1, characterized in that for the membrane separation of carbon dioxide by a pervaporation method, a secondary (permeate) side of the membrane separation apparatus equipped with a zeolite membrane for carbon dioxide separation is depressurized. The invention of claim 3 is advantageous in that a partial pressure difference that is the driving force for the membrane permeation of carbon dioxide is ensured, whereby the membrane area can be reduced, and also the transportation power for the separated, recovered carbon dioxide is provided.

The invention of claim 4 is the method for regenerating a carbon dioxide absorbing liquid in a carbon dioxide recovery method defined in claim 2, characterized in that for the membrane separation of moisture by a pervaporation method, moisture that has permeated to a secondary (permeate) side of the membrane separation apparatus equipped with a zeolite membrane for moisture separation is condensed by a cooling source to depressurize the secondary (permeate) side of the membrane separation apparatus. The invention of claim 4 is advantageous in that a partial pressure difference that is the driving force for the membrane permeation of moisture is ensured, whereby the membrane area can be reduced, and also electric power like a vacuum pump in claim 3 is not required.

The invention of claim 5 is the method for regenerating a carbon dioxide absorbing liquid in a carbon dioxide recovery method defined in claim 1 or 3, characterized in that as the amount of heat required for the membrane separation of carbon dioxide by a pervaporation method, a hot gas to be treated that is originally to be treated is introduced as a heat source into the membrane separation apparatus equipped with a zeolite membrane for carbon dioxide separation. The invention of claim 5 is advantageous in that the heat of exhaust gas, which has been discarded in the past, is used, whereby no additional heat source is required for the regeneration of the carbon dioxide absorbing liquid, allowing for significant energy reduction.

The invention of claim 6 is the method for regenerating a carbon dioxide absorbing liquid in a carbon dioxide recovery method defined in claim 2 or 4, characterized in that as the amount of heat required for the membrane separation of moisture by a pervaporation method, a hot gas to be treated that is originally to be treated is introduced as a heat source into the membrane separation apparatus equipped with a zeolite membrane for moisture separation. The invention of claim 6 is advantageous in that, similarly to claim 5, the heat of exhaust gas, which has been discarded in the past, is used, whereby no additional heat source is required for the regeneration of the moisture absorbing liquid, allowing for significant energy reduction.

The invention of claim 7 is the method for regenerating a carbon dioxide absorbing liquid in a carbon dioxide recovery method defined in claim 5 or 6, characterized in that the membrane separation apparatus is equipped with a flow path for a hot gas to be treated, and a hot gas to be treated that is originally to be received as a heat source in the flow path as the amount of heat required for the membrane separation of carbon dioxide or moisture by a pervaporation method. The invention of claim 7 is advantageous in that the heat energy required for pervaporation separation can be added on the spot of membrane separation, whereby, as a result, the absorbing liquid heating temperature can be lowered, and also no additional heater is required.

EXPLANATION OF REFERENCE NUMERALS

Figure 1:
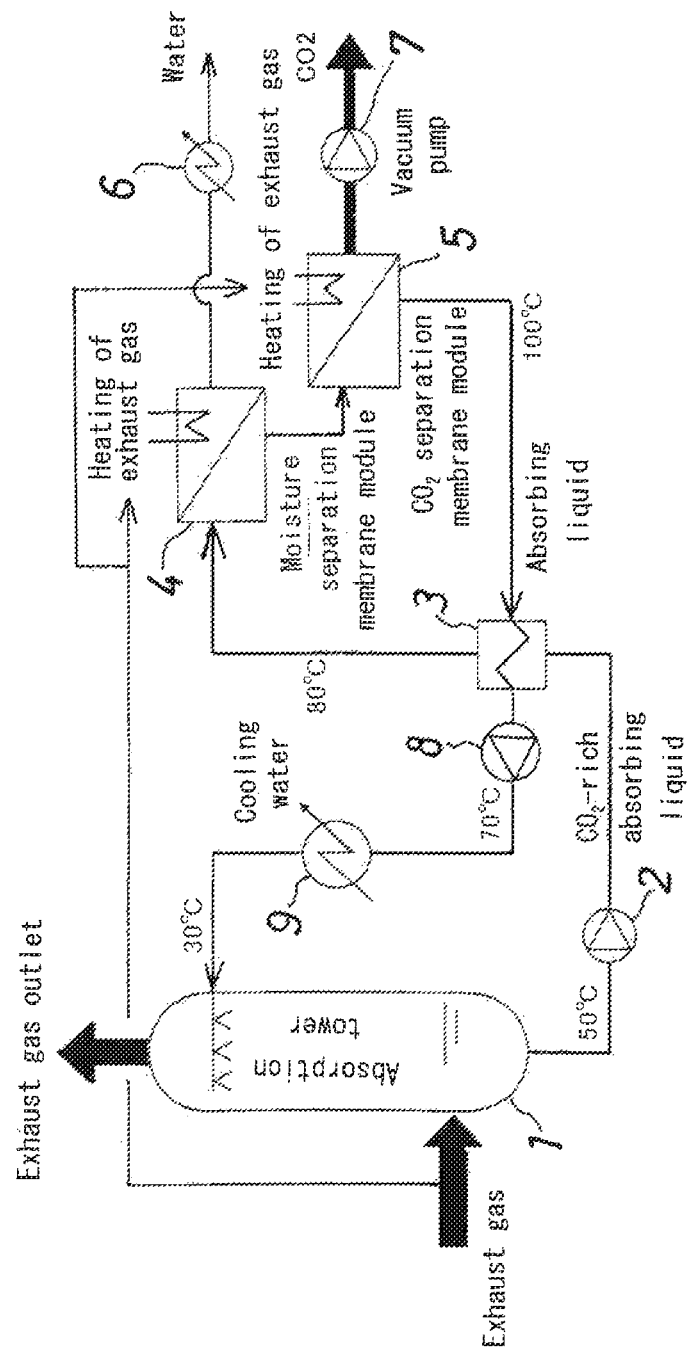
FIG. 1 is a flow sheet showing an embodiment of the method for regenerating a carbon dioxide absorbing liquid in a carbon dioxide recovery method of the invention.

1: Absorption tower
2: Pump
3: Heat exchanger
4: Membrane separation apparatus equipped with a zeolite membrane for moisture separation (separation membrane module)
5: Membrane separation apparatus equipped with a zeolite membrane for carbon dioxide separation (separation membrane module)
6: Condenser
7: Vacuum pump
8: Pump
9: Cooler
10: Multi-tube separation membrane module
13: Zeolite membrane element for carbon dioxide separation
21: Flow path for a hot gas to be treated, which receives an exhaust gas, etc., as a heat source

MODE FOR CARRYING OUT THE INVENTION

Next, embodiments of the invention will be described with reference to the drawings. However, the invention is not limited thereto.

FIG. 1 is a flow sheet showing an embodiment of the method for regenerating a carbon dioxide absorbing liquid in a carbon dioxide recovery method of the invention.

With reference to the figure, the method for regenerating a carbon dioxide absorbing liquid in a carbon dioxide recovery method of the invention is characterized in that in a carbon dioxide recovery method including a carbon dioxide absorption step of bringing a gas to be treated containing carbon dioxide, such as an exhaust gas, into contact with a carbon dioxide absorbing liquid in an absorption tower (1), thereby removing carbon dioxide from the gas to be treated, such as an exhaust gas, and a regeneration step of removing carbon dioxide from a rich solution that has absorbed carbon dioxide in the carbon dioxide absorption step, thereby achieving regeneration, the rich solution that has absorbed carbon dioxide is guided in liquid form to a membrane separation apparatus (5) that is selectively permeable to carbon dioxide and equipped with a zeolite membrane for carbon dioxide separation, carbon dioxide is separated and removed by a pervaporation method, and the carbon dioxide absorbing liquid is thus regenerated.

In the method of the invention, in an equilibrium reaction (absorption/desorption) state between carbon dioxide and the absorbing liquid, the equilibrium state is transitioned by using a zeolite membrane to effectively promote the reaction, that is, the so-called membrane reactor function is used.

Here, in large-scale carbon dioxide treatment facilities, a method that uses an amine-based carbon dioxide absorbing liquid is the most popular separation operation. In the amine absorption method, the reaction formula between monoethanolamine (MEA), which is used as an amine-based carbon dioxide absorbing liquid, and carbon dioxide is as follows.

In the reaction formula, the rightward direction is the absorption step, which is an exothermic reaction, and the leftward direction is the regeneration step, which is an endothermic reaction.

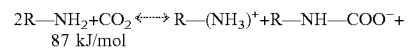

$$2R\text{—}NH_2 + CO_2 \leftrightarrow R\text{—}(NH_3)^+ + R\text{—}NH\text{—}COO^- + 87 \text{ kJ/mol}$$

In the regeneration step, the reaction takes place at a temperature of around 100 to 130° C. (in the absorption step, at a temperature of 40 to 50° C.). In such a regeneration step, when carbon dioxide is preferentially removed (separated) by membrane separation, a concentration of carbon dioxide in the above reaction formula becomes relatively lower, and the leftward reaction is more promoted. As a result, a change (transition) occurs in the previous reaction equilibrium relationship.

In this case, the direction toward an endothermic reaction is promoted, and, therefore, the reaction temperature is lowered to reach an equilibrium state. For example, regeneration that has been conventionally carried out at a temperature of 130° C. is carried out at a temperature of 100° C. This contributes to the reduction of the sensible heat for heating the absorbing liquid (e.g., the amount of heat for an absorbing liquid at a temperature of 50° C. to be raised to 130° C.), which is one element of the amount of heat required for regenerating an absorbing liquid. In addition, the temperature of the heat source required for regeneration can also be lowered, leading to the possibility of the use of low-grade heat sources, which have been unusable and discharged in the past. In addition, owing to the decrease in the temperature of absorbing liquid regeneration, enhancing effects on the durability of the absorbing liquid itself are also expected.

Here, examples of zeolite membranes to be mounted on the carbon-dioxide-permeable membrane separation apparatus (separation membrane module) (5) include zeolite membranes such as silicalite-type zeolite membranes and DDR-type zeolite membranes, as well as composite zeolite membranes including a combination of such a zeolite membrane and a Y-type zeolite membrane.

Examples of gases to be treated from which carbon dioxide is recovered are not limited to combustion exhaust gases but include various gases such as natural gases, biogases, and chemical process gases.

According to the method for regenerating a carbon dioxide absorbing liquid in a carbon dioxide recovery method of the invention, in the regeneration step where a rich solution that has absorbed carbon dioxide is regenerated as an absorbing liquid, in an equilibrium reaction (absorption/desorption) state between carbon dioxide and the absorbing liquid, the equilibrium state is transitioned using a membrane separation apparatus equipped with a zeolite membrane to effectively promote the reaction, that is, the so-called membrane reactor function is used, thereby constructing an energy-saving hybrid system that is a combination of a chemical absorption method and a zeolite membrane; as a result, the heat energy required for the regeneration of the absorbing liquid can be reduced, and the cost of carbon dioxide separation and removal can be significantly reduced. In addition, by the transition of the equilibrium state, the temperature at which the absorbing liquid is regenerated can be lowered, and enhancing effects on the durability of the absorbing liquid itself can also be expected.

Further, in the method for regenerating a carbon dioxide absorbing liquid in a carbon dioxide recovery method of the invention, it is preferable that before the rich solution that has absorbed carbon dioxide is guided in liquid form to the membrane separation apparatus (5) that is selectively permeable to carbon dioxide, in order to separate moisture contained in the rich solution that has absorbed carbon dioxide from the rich solution absorbing liquid, the rich solution is guided in liquid form to a membrane separation apparatus (separation membrane module) (4) that is selectively permeable to moisture and equipped with a zeolite membrane for moisture separation, and moisture is separated and removed by a pervaporation method.

This is advantageous in that at the time of the membrane separation of carbon dioxide by a pervaporation method, because the presence of moisture is a factor that inhibits the membrane permeation of carbon dioxide, moisture is previously removed before the separation of carbon dioxide; as a result, the carbon dioxide separation performance can be sufficiently exhibited, and also the composition of the absorbing liquid can be stabilized without an increase in moisture content.

Preferred examples of zeolite membranes mounted on the water-permeable membrane separation apparatus (separation membrane module) (4) include ZSM-5-type zeolite membranes and MOR-type zeolite membranes.

In addition, in the method for regenerating a carbon dioxide absorbing liquid in a carbon dioxide recovery method of the invention, it is preferable that for the membrane separation of carbon dioxide by a pervaporation method, a secondary (permeate) side of the membrane separation apparatus (separation membrane module) (5) equipped with a zeolite membrane for carbon dioxide separation is depressurized by a vacuum pump (7), for example.

This is advantageous in that a partial pressure difference that is the driving force for the membrane permeation of carbon dioxide is ensured, whereby the membrane area can be reduced, and also the transportation power for the separated, recovered carbon dioxide is provided.

In the method for regenerating a carbon dioxide absorbing liquid in a carbon dioxide recovery method of the invention, it is preferable that for the membrane separation of moisture by a pervaporation method, moisture that has permeated to a secondary (permeate) side of the membrane separation apparatus (separation membrane module) (4) equipped with a zeolite membrane for moisture separation is condensed by a cooling source such as a condenser (6) to depressurize the secondary (permeate) side of the membrane separation apparatus.

This is advantageous in that a partial pressure difference that is the driving force for the membrane permeation of moisture is ensured, whereby the membrane area can be reduced, and also electric power like a vacuum pump is not required.

In the method for regenerating a carbon dioxide absorbing liquid in a carbon dioxide recovery method of the invention, it is preferable that as the amount of heat required for the membrane separation of carbon dioxide by a pervaporation method, a hot gas to be treated that is originally to be treated, such as an exhaust gas, is introduced as a heat source into the membrane separation apparatus (separation membrane module) (5) equipped with a zeolite membrane for carbon dioxide separation.

This is advantageous in that the heat of exhaust gas, which has been discarded in the past, is used, whereby no additional heat source is required for the regeneration of the carbon dioxide absorbing liquid, allowing for significant energy reduction.

In the method for regenerating a carbon dioxide absorbing liquid in a carbon dioxide recovery method of the invention, it is preferable that as the amount of heat required for the membrane separation of moisture by a pervaporation method, a hot gas to be treated that is originally to be treated, such as an exhaust gas, is introduced as a heat source into the membrane separation apparatus (separation membrane module) (4) equipped with a zeolite membrane for moisture separation.

This is advantageous in that the heat of exhaust gas, which has been discarded in the past, is used, whereby no additional heat source is required for the regeneration of the moisture absorbing liquid, allowing for significant energy reduction.

In the method for regenerating a carbon dioxide absorbing liquid in a carbon dioxide recovery method of the invention, it is preferable that the membrane separation apparatus (separation membrane module) (4) or (5) is equipped with a flow path (21) for a hot gas to be treated, and a hot gas to be treated that is originally to be treated, such as an exhaust gas, is received as a heat source in the flow path (21) as the amount of heat required for the membrane separation of carbon dioxide or moisture by a pervaporation method.

This is advantageous in that the heat energy required for pervaporation separation can be added on the spot of membrane separation, whereby, as a result, the absorbing liquid heating temperature can be lowered. Further, no additional heater is required.

Hereinafter, an embodiment of the method for regenerating a carbon dioxide absorbing liquid in a carbon dioxide recovery method of the invention will be described in detail with reference to FIG. 1, taking a combustion exhaust gas as an example of a gas to be treated from which carbon dioxide is recovered.

In the figure, a combustion exhaust gas to be treated from a boiler or the like is introduced into the lower part of an absorption tower (1). Meanwhile, an amine-based carbon dioxide absorbing liquid is sent from the upper part of the absorption tower (1), whereby the exhaust gas is contacted with the absorbing liquid in countercurrent, and carbon dioxide is absorbed by the absorbing liquid. At this time, moisture is also absorbed by the absorbing liquid.

Next, the absorbing liquid rich in carbon dioxide is discharged from the bottom of the absorption tower (1) and transported by the operation of a pump (2). Ina heat exchanger (3), the absorbing liquid rich in carbon dioxide is preheated by heat exchange with the below-mentioned regenerated absorbing liquid.

Subsequently, prior to the step of regenerating the absorbing liquid, in order to separate moisture contained in the absorbing liquid from the absorbing liquid, the carbon-dioxide-rich absorbing liquid is guided in liquid form to a zeolite membrane separation apparatus (separation membrane module) (4) that is selectively permeable to moisture, and moisture contained in the carbon-dioxide-rich absorbing liquid is separated and removed by a pervaporation method.

For the separation of moisture by a pervaporation method, heating is required. That is, reaction heat for the dissociation of moisture and the absorbing liquid and evaporation heat for the evaporation of moisture after permeation are required. Thus, it is preferable that some of the exhaust gas to be treated is used as the heating source and introduced directly to heat the inside of the separation membrane module (4).

Moisture that has passed through the zeolite membrane of the separation membrane module (4) is condensed in a downstream condenser (6), whereby the pressure on the membrane secondary (permeate) side can be kept at vacuum, and the driving force for membrane permeation can be obtained.

The separation membrane module (4) that is preferentially permeable to moisture is provided for the following reasons. In a downstream zeolite membrane separation apparatus (separation membrane module) (5) that is selectively permeable to carbon dioxide, if moisture is present in the absorbing liquid, moisture may preferentially selectively pass through the zeolite membrane there, inhibiting the permeation of carbon dioxide; thus, the separation membrane module (4) is provided to allow the downstream separation membrane module (5) to sufficiently exhibit the carbon dioxide separation performance. In addition, in the case where moisture is originally present in the gas to be treated, such as an exhaust gas, the separation membrane module (4) is provided also to prevent the moisture from being contained in the absorbing liquid and changing the composition of the absorbing liquid.

Preferred examples of zeolite membranes mounted on the water-permeable separation membrane module (4) include ZSM-5-type zeolite membranes and MOR-type zeolite membranes.

The carbon-dioxide-rich absorbing liquid dehydrated by the water-permeable separation membrane module (4) is guided in liquid form to the membrane separation apparatus (separation membrane module) (5) that is selectively permeable to carbon dioxide and equipped with a zeolite membrane for carbon dioxide separation, and carbon dioxide is separated and removed from the carbon-dioxide-rich absorbing liquid by a pervaporation method. The carbon dioxide absorbing liquid is thus regenerated.

As in the case of the upstream water-permeable separation membrane module (4), heating is also required for the separation of carbon dioxide by a pervaporation method. That is, reaction heat for the dissociation of the carbon-dioxide-rich absorbing liquid and carbon dioxide is required. Thus, it is preferable that some of the exhaust gas to be treated is used as the heating source and introduced directly to heat the inside of the separation membrane module (5).

When carbon dioxide is preferentially separated and removed from the absorbing liquid in the carbon dioxide separation membrane module (5) having a heating function, the dissociation (regeneration) reaction can progress at lower reaction temperatures than in the prior art.

Here, as the zeolite membrane mounted on the carbon-dioxide-permeable membrane separation apparatus (separation membrane module) (5), it is preferable to use a zeolite membrane such as a silicalite-type zeolite membrane or a DDR-type zeolite membrane, or alternatively a composite zeolite membrane including a combination of such a zeolite membrane and a Y-type zeolite membrane.

The vacuum pump (7) provided downstream of the carbon-dioxide-permeable separation membrane module (5) is the transportation power for the recovery of carbon dioxide passed through the zeolite membrane for carbon dioxide separation, and also has the function of keeping the pressure on the membrane secondary (permeate) side at vacuum to obtain the driving force for membrane permeation.

The regenerated carbon dioxide absorbing liquid (lean solution), which has been regenerated through the dissociation of carbon dioxide in the carbon-dioxide-permeable separation membrane module (5), is transported to the heat exchanger (3) mentioned above, and preheats a carbon-dioxide-rich absorbing liquid from the absorption tower (1), thereby cooling itself. Further, the lean solution is transported by the operation of a pump (8), cooled in a cooler (9) to enhance the absorption function, and then fed again to the absorption tower (1). As a result, the process including a step of absorbing carbon dioxide from the exhaust gas to be treated and a step of regenerating the carbon dioxide absorbing liquid is repeated.

According to the method for regenerating a carbon dioxide absorbing liquid in a carbon dioxide recovery method of the invention, in the regeneration of an absorbing liquid that has absorbed carbon dioxide, a dissociation reaction can take place at lower temperatures than in the prior art.

With the decrease in the temperature of the carbon dioxide dissociation reaction, the amount of sensible heat for heating the absorbing liquid is reduced. In addition, it is possible to use low-grade heat sources that have been unusable in the past. Under such conditions where exhaust gases can be used, the heat energy required for regeneration is significantly reduced. Further, enhancing effects on the durability of the absorbing liquid itself are also expected.

Further, the heat load on the heat exchanger (3), which is for the absorbing liquid that circulates between the carbon dioxide absorption tower (1) and the separation membrane module (5) that is selectively permeable to carbon dioxide, and the cooler (9), which cools the regenerated carbon dioxide absorbing liquid (lean solution) before entering the absorption tower (1), is reduced, leading to size reduction. In addition, when the equilibrium state temperature of the carbon dioxide dissociation reaction is further lowered, the heat exchanger (3) itself is unnecessary, and the cost of the separation and removal of carbon dioxide can be significantly reduced.

Figure 2:
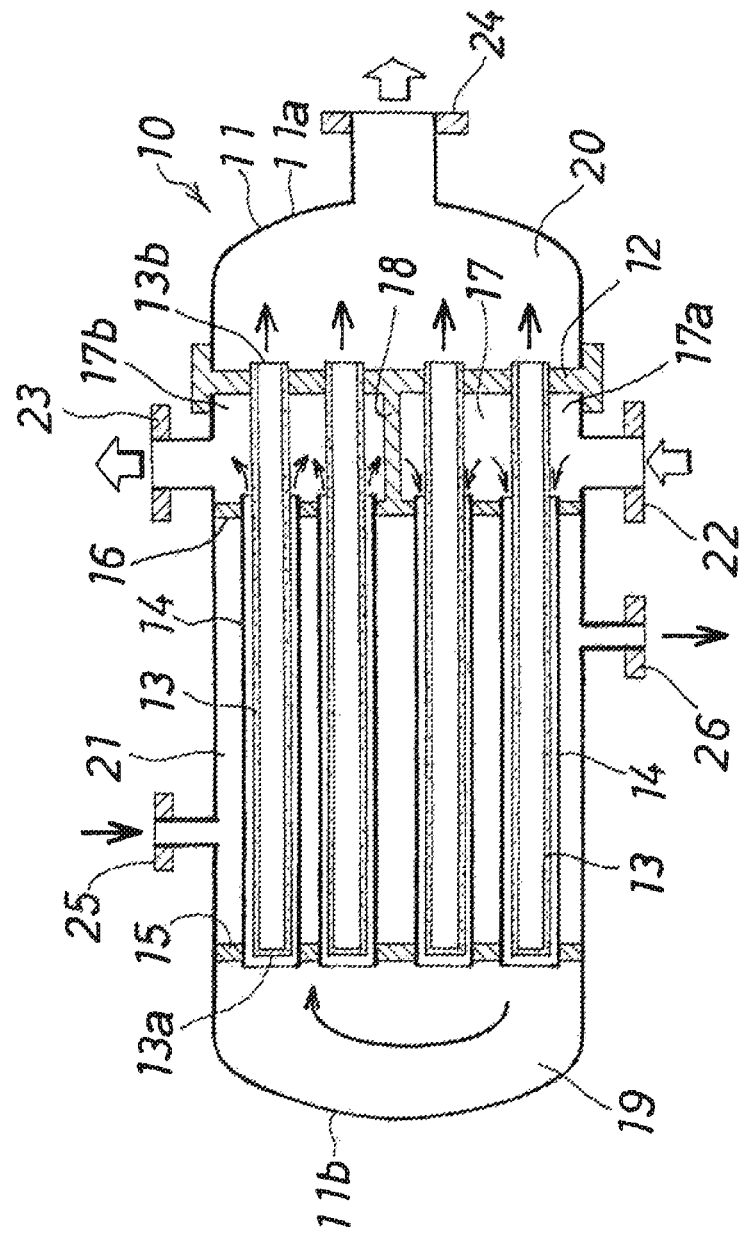
FIG. 2 is an enlarged longitudinal sectional view of a membrane separation apparatus for use in the method for regenerating a carbon dioxide absorbing liquid in a carbon dioxide recovery method of the invention.

FIG. 2 is an enlarged longitudinal sectional view showing an example of a multi-tube separation membrane module (10) used as the membrane separation apparatus (5) that is selectively permeable to carbon dioxide or alternatively as the membrane separation apparatus (4) that is selectively permeable to moisture in the method for regenerating a carbon dioxide absorbing liquid in a carbon dioxide recovery method of the invention.

First, the following explains the case where the multi-tube separation membrane module (10) is used as a membrane separation apparatus (5) that is selectively permeable to carbon dioxide.

With reference to the figure, the multi-tube separation membrane module (10) has a double-tube structure including a tubular zeolite membrane element (13) for carbon dioxide separation and an outer tube (14) coupled thereto. The multi-tube separation membrane module (10) has the function of sending a heat source (here, an exhaust gas) into the shell space (casing space) outside the outer tube (14), thereby heating the outer tube (14) and the tubular zeolite membrane element (13) for carbon dioxide separation.

The multi-tube separation membrane module (10) has, inside a casing (11) having an elliptical longitudinal cross-section, a plurality of tubular zeolite membrane elements (13) for carbon dioxide separation with one end (13a) sealed and the other end (13b) open.

In this embodiment, a tube plate (12) for tubular zeolite membrane element attachment is provided in the casing (11). The tubular membrane elements (13) are each attached approximately perpendicularly to the tube plate (12) in a cantilever fashion such that the tube plate (12) penetrates through the open ends (13b).

Here, as the tubular zeolite membrane element (13), one having a tubular porous substrate made of ceramic, organic polymer, or metal and a zeolite membrane formed thereon is used, for example. Specific examples of zeolite membranes include zeolite membranes such as silicalite-type zeolite membranes and DDR-type zeolite membranes, as well as composite zeolite membranes including a combination of such a zeolite membrane and a Y-type zeolite membrane.

For practical purposes, the size of the tubular zeolite membrane element (13) for carbon dioxide separation used is 30 to 300 cm in length, 10 to 30 mm in outer diameter, and 1 to 4 mm in thickness, approximately. For practical purposes, the number of tubular zeolite membrane elements (13) supported by one tube plate (12) is about 2 to 3000.

In the casing (11), a pair of left and right tube plates (15) and (16) for outer tube attachment are arranged to face each other at a predetermined distance. The tubular zeolite membrane elements (13) for carbon dioxide separation and the same number of outer tubes (14) are laid across the tube plates (15) and (16) for outer tube attachment, and the tubular zeolite membrane elements (13) are each inserted into an outer tube (14). The pair of left and right tube plates (15) and (16) for outer tube attachment are hermetically engaged with the inner surface of the casing (11).

Further, a carbon-dioxide-rich absorbing liquid inlet (22) is connected to the lower end of the tube wall of the casing (11) in a position between the tube plate (12) for membrane element attachment and the right-side tube plate (16) for outer tube attachment. An absorbing liquid housing chamber (17) formed in the space in the casing (11) between the tube plate (12) for membrane element attachment and the right-side tube plate (16) for outer tube attachment is divided into a lower absorbing liquid inflow chamber (17a) and an upper absorbing liquid discharge chamber (17b) by a partition wall (18) horizontally laid at the center of the height of the casing (11).

In addition, the space between a tube wall (11b) at the left end of the casing (11) and the left-side tube plate (15) for outer tube attachment serves as an absorbing liquid turn section (19) and section (20).

Meanwhile, an absorbing liquid outlet (23) is connected to the upper end of the tube wall of the casing (11) in a position between the tube plate (12) for membrane element attachment and the right-side tube plate (16) for outer tube attachment. A tube wall (11a) at the right end of the casing (11) has connected thereto a carbon dioxide outlet (24) for the recovery of carbon dioxide that has passed through the zeolite membrane for carbon dioxide separation of each tubular zeolite membrane element (13) for carbon dioxide separation.

Further, the separation membrane module (10) is equipped with a flow path (21) for a hot gas to be treated, which receives, as the amount of heat required for the membrane separation of carbon dioxide by a pervaporation method, a hot gas to be treated that is originally to be treated (e. g., exhaust gas) as a heat source. Here, an inlet (25) for a hot gas to be treated is connected to the upper end of the tube wall of the casing (11) in a position closer to the left-side tube plate (15) for outer tube attachment, and an outlet (26) for a hot gas to be treated is connected to the lower end of the tube wall of the casing (11) in a position closer to the right-side tube plate (16) for outer tube attachment.

As above, when a hot gas to be treated that is originally to be treated is introduced as a heat source into the multi-tube separation membrane module (10) used as the membrane separation apparatus (5) equipped with a zeolite membrane for carbon dioxide separation as the amount of heat required for the membrane separation of carbon dioxide by a pervaporation method, this is advantageous in that no additional heat source is required for the regeneration of the carbon dioxide absorbing liquid, allowing for significant energy reduction.

Next, the following explains the case where the multi-tube separation membrane module (10) shown in FIG. 2 mentioned above is used as a membrane separation apparatus (separation membrane module) (4) for moisture separation that is selectively permeable to moisture, which is used, before the rich solution that has absorbed carbon dioxide is guided to the membrane separation apparatus (5) that is selectively permeable to carbon dioxide, for separating moisture contained therein from the rich solution absorbing liquid, the rich solution being in liquid form.

In this case, as the tubular zeolite membrane element (13) mounted on the moisture-permeable membrane separation apparatus (separation membrane module) (4), one having a tubular porous substrate made of ceramic, organic polymer, or metal and a zeolite membrane formed thereon is used, for example. Preferred specific examples of moisture-permeable zeolite membranes include ZSM-5-type zeolite membranes and MOR-type zeolite membranes.

Further, the separation membrane module (10) is equipped with a flow path (21) for a hot gas to be treated, which receives, as the amount of heat required for the membrane separation of moisture by a pervaporation method, a hot gas to be treated that is originally to be treated (e. g., exhaust gas) as a heat source.

As above, upstream of the membrane separation apparatus (5) that is selectively permeable to carbon dioxide, when a hot gas to be treated that is originally to be treated is introduced as a heat source into the multi-tube separation membrane module (10) used as the membrane separation apparatus (4) equipped with a zeolite membrane for moisture separation as the amount of heat required for the membrane separation of moisture by a pervaporation method, this is advantageous in that no additional heat source is required for the regeneration of the moisture absorbing liquid, allowing for significant energy reduction.

EXAMPLES

Next, the invention will be described with reference to examples and comparative examples. However, the invention is not limited to these examples.

Example 1

In a carbon dioxide recovery method using an amine-based carbon dioxide absorbing liquid, the method for regenerating a carbon dioxide absorbing liquid of the invention was implemented using the apparatus shown by the flow sheet of FIG. 1.

In the figure, a combustion exhaust gas to be treated having a temperature of 150° C. from a boiler is introduced into the lower part of an absorption tower (1). Meanwhile, an amine-based carbon dioxide absorbing liquid having a temperature of 30° C. is sent from the upper part of the absorption tower (1), whereby the exhaust gas is contacted with the absorbing liquid in countercurrent, and carbon dioxide is absorbed by the absorbing liquid. At this time, moisture is also absorbed by the absorbing liquid.

Incidentally, as the amine-based carbon dioxide absorbing liquid, a monoethanolamine (MEA) solution (manufactured by Nippon Shokubai Co., Ltd.) was used.

Next, the absorbing liquid rich in carbon dioxide having a temperature of 50° C. is discharged from the bottom of the absorption tower (1) and transported by the operation of a pump (2). In a heat exchanger (3), the absorbing liquid rich in carbon dioxide is preheated by heat exchange with the below-mentioned regenerated carbon dioxide absorbing liquid having a temperature of 100° C. regenerated (lean solution).

Subsequently, prior to the step of regenerating the absorbing liquid, in order to separate moisture contained in the absorbing liquid from the absorbing liquid, the carbon-dioxide-rich absorbing liquid having a temperature of 80° C. from the heat exchanger (3) was guided in liquid form to a zeolite membrane separation apparatus (separation membrane module) (4) that is selectively permeable to moisture, and moisture contained in the carbon-dioxide-rich absorbing liquid was separated and removed by a pervaporation method.

Here, the water-permeable separation membrane module (4) had mounted thereon a ZSM-5-type zeolite membrane.

For the separation of moisture by a pervaporation method, reaction heat for the dissociation of moisture and the absorbing liquid and evaporation heat for the evaporation of moisture after permeation are required. Thus, some of the exhaust gas to be treated having a temperature of 150° C. was used as the heating source and introduced directly to heat the inside of the separation membrane module (4). At this time, as the zeolite membrane separation apparatus (separation membrane module) (4) that is selectively permeable to moisture, the multi-tube separation membrane module (10) shown in FIG. 2 mentioned above was used.

Moisture that had passed through the zeolite membrane of the separation membrane module (4) was condensed in a downstream condenser (6), whereby the pressure on the membrane secondary (permeate) side was kept at vacuum, and the driving force for membrane permeation was obtained.

The separation membrane module (4) that is preferentially permeable to moisture was provided for the following reasons. In a downstream zeolite membrane separation apparatus (separation membrane module) (5) that is selectively permeable to carbon dioxide, if moisture is present in the absorbing liquid, moisture may preferentially selectively pass through the zeolite membrane there, inhibiting the permeation of carbon dioxide; thus, the separation membrane module (4) was provided to allow the downstream separation membrane module (5) to sufficiently exhibit the carbon dioxide separation performance. In addition, in the case where moisture is originally present in the exhaust gas to be treated, the separation membrane module (4) was provided also to prevent the moisture from being contained in the absorbing liquid and changing the composition of the absorbing liquid.

Next, the carbon-dioxide-rich absorbing liquid dehydrated by the water-permeable separation membrane module (4) was guided in liquid form to the membrane separation apparatus (separation membrane module) (5) that is selectively permeable to carbon dioxide and equipped with a zeolite membrane for carbon dioxide separation, and carbon dioxide was separated and removed from the carbon-dioxide-rich absorbing liquid by a pervaporation method. The carbon dioxide absorbing liquid was thus regenerated.

Here, the carbon-dioxide-permeable membrane separation apparatus (separation membrane module) (5) had mounted thereon a DDR-type zeolite membrane (manufactured by NGK Insulators, Ltd.).

Also for the separation of carbon dioxide by a pervaporation method, reaction heat for the dissociation of the carbon-dioxide-rich absorbing liquid and carbon dioxide is required. Thus, some of the exhaust gas to be treated having a temperature of 150° C. was used as the heating source and introduced directly to heat the inside of the separation membrane module (5). At this time, as the zeolite membrane separation apparatus (separation membrane module) (5) that is selectively permeable to carbon dioxide, the multi-tube separation membrane module (10) shown in FIG. 2 mentioned above was used.

When carbon dioxide is preferentially separated and removed from the absorbing liquid in the carbon dioxide separation membrane module (5) having a heating function, the dissociation (regeneration) reaction can progress at lower reaction temperatures than in the prior art. The temperature of the regenerated carbon dioxide absorbing liquid regenerated (lean solution) was 100° C.

A vacuum pump (7) was provided downstream of the carbon-dioxide-permeable separation membrane module (5) for use as the transportation power for the recovery of carbon dioxide that had passed through the zeolite membrane for carbon dioxide separation, and also achieved the function of keeping the pressure on the membrane secondary (permeate) side at vacuum to obtain the driving force for membrane permeation.

The regenerated carbon dioxide absorbing liquid (lean solution), which has been regenerated through the dissociation of carbon dioxide in the carbon-dioxide-permeable separation membrane module (5), is transported to the heat exchanger (3) mentioned above, and preheats a carbon-dioxide-rich absorbing liquid from the absorption tower (1), thereby cooling itself. The lean solution from the heat exchanger (3) had a temperature of 70° C. Such a lean solution was transported by the operation of a pump (8) and cooled in a cooler (9) to enhance the absorption function. The lean solution after cooling had a temperature of 30° C. The lean solution was then fed again to the absorption tower (1). Thus, the process including a step of absorbing carbon dioxide from the exhaust gas to be treated and a step of regenerating the carbon dioxide absorbing liquid was repeated.

Comparative Example 1

Figure 3:
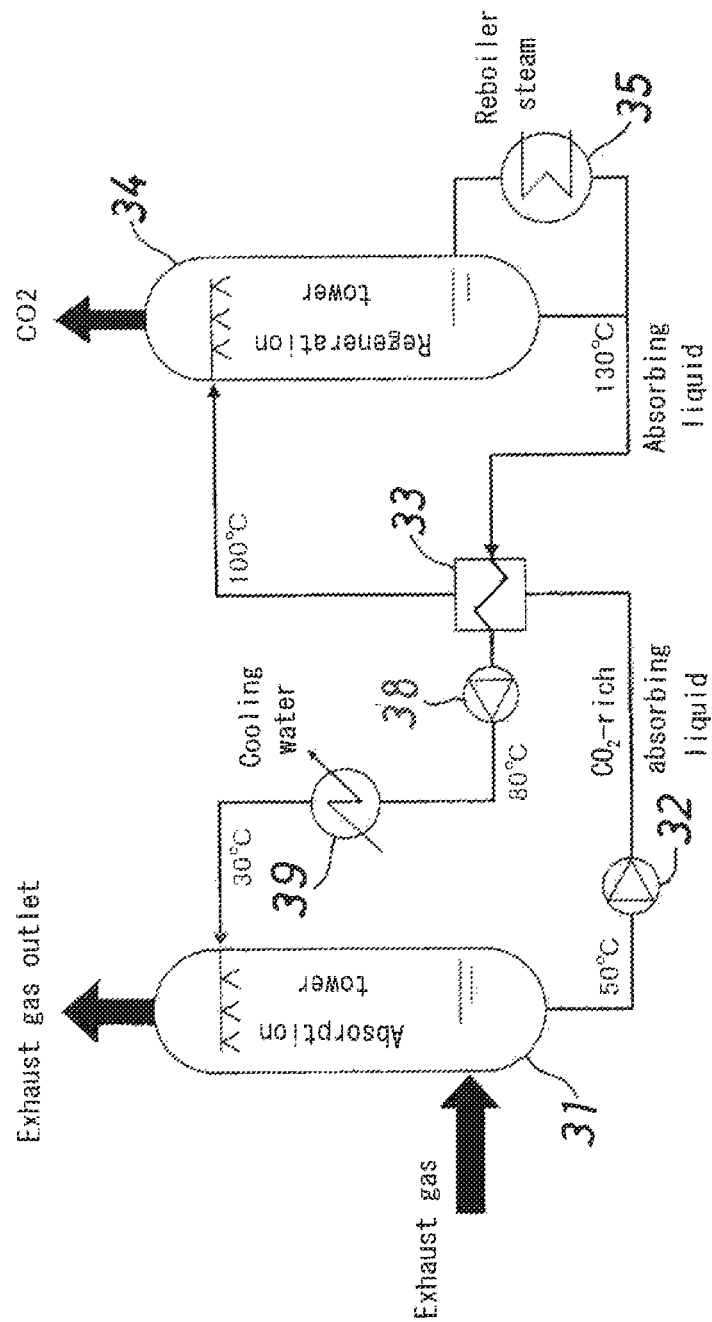
FIG. 3 is a flow sheet showing an embodiment of a conventional method for regenerating a carbon dioxide absorbing liquid in a carbon dioxide recovery method.

For comparison, a method for separating and removing carbon dioxide from a combustion exhaust gas from a boiler was implemented using the conventional apparatus for regenerating a carbon dioxide absorbing liquid in a carbon dioxide recovery method using an amine-based carbon dioxide absorbing liquid, which is shown by the flow sheet of FIG. 3.

With reference to the figure, a combustion exhaust gas to be treated having a temperature of 150° C. from a boiler is introduced into the lower part of an absorption tower (31). Meanwhile, an amine-based carbon dioxide absorbing liquid having a temperature of 30° C. is sent from the upper part of the absorption tower (31), whereby the exhaust gas is contacted with the absorbing liquid in countercurrent, and carbon dioxide is absorbed by the absorbing liquid. At this time, moisture is also absorbed by the absorbing liquid.

Next, the absorbing liquid rich in carbon dioxide having a temperature of 50° C. is discharged from the bottom of the absorption tower (31) and transported by the operation of a pump (32). In a heat exchanger (33), the absorbing liquid rich in carbon dioxide is preheated by heat exchange with the below-mentioned regenerated carbon dioxide absorbing liquid having a temperature of 130° C. regenerated (lean solution).

Subsequently, the carbon-dioxide-rich absorbing liquid having a temperature of 100° C. from the heat exchanger (33) was introduced into the top of a regeneration tower (34) and heated by a reboiler (35) in the regeneration tower (34), thereby releasing carbon dioxide and regenerating the absorbing liquid. The temperature of the regenerated carbon dioxide absorbing liquid regenerated (lean solution) was 130° C.

Then, the regenerated carbon dioxide absorbing liquid regenerated in the regeneration tower (34) (lean solution) is transported to the heat exchanger (33) mentioned above, and preheats a carbon-dioxide-rich absorbing liquid from the absorption tower (31), thereby cooling itself. The lean solution from the heat exchanger (33) had a temperature of 80° C. Such a lean solution was transported by the operation of a pump (38) and cooled in a cooler (39). The lean solution after cooling had a temperature of 30° C. The lean solution was then fed again to the absorption tower (31). Thus, the process including a step of absorbing carbon dioxide from the exhaust gas to be treated and a step of regenerating the carbon dioxide absorbing liquid was repeated.

It turns out that according to the method for regenerating a carbon dioxide absorbing liquid in a carbon dioxide recovery method of the invention of Example 1, in the regeneration of the absorbing liquid that has absorbed carbon dioxide, a dissociation reaction can take place at lower temperatures than in the prior art of Comparative Example 1.

With the decrease in the temperature of the carbon dioxide dissociation reaction, the amount of sensible heat for heating the absorbing liquid is reduced. In addition, it is possible to use low-grade heat sources that have been unusable in the past. Under such conditions where exhaust gases can be used, the heat energy required for regeneration is significantly reduced. Further, enhancing effects on the durability of the absorbing liquid itself are also expected.

Further, the heat load on the heat exchanger (3), which is for the absorbing liquid that circulates between the carbon dioxide absorption tower (1) and the separation membrane module (5) that is selectively permeable to carbon dioxide, and the cooler (9), which cools the regenerated carbon dioxide absorbing liquid (lean solution) before entering the absorption tower (1), is reduced, allowing for size reduction. In addition, when the equilibrium state temperature of the carbon dioxide dissociation reaction is further lowered, the heat exchanger (3) itself is unnecessary, and the cost of the separation and removal of carbon dioxide can be significantly reduced.

The invention claimed is:

1. A method for regenerating a carbon dioxide absorbing liquid in a carbon dioxide recovery method, comprising:
   a carbon dioxide absorption step of bringing a gas to be treated containing carbon dioxide into contact with a carbon dioxide absorbing liquid, thereby removing carbon dioxide from the gas to be treated, and
   a regeneration step of removing carbon dioxide from a rich solution that has absorbed carbon dioxide in the carbon dioxide absorption step, thereby regenerating the carbon dioxide absorbing liquid,
   the rich solution that has absorbed carbon dioxide is guided in liquid form to a membrane separation apparatus that is selectively permeable to carbon dioxide and equipped with a zeolite membrane for carbon dioxide separation,
   carbon dioxide is separated and removed by a pervaporation method, and
   the carbon dioxide absorbing liquid is thus regenerated,
   the membrane separation apparatus being a multi-tube separation membrane module, the multi-tube separation membrane module having a double-tube structure including a tubular zeolite membrane element for separating carbon dioxide and an outer tube coupled thereto and having the function of sending a heat source into the shell space outside the outer tube, thereby heating the outer tube and the tubular zeolite membrane element for carbon dioxide separation,
   the membrane separation apparatus being equipped with a flow path for:
   treating a high-temperature gas, and
   receiving a high-temperature gas to be treated that is originally to be treated as a heat source in the flow path as the amount of heat required for the membrane separation of carbon or moisture by a pervaporation device.

2. The method for regenerating a carbon dioxide absorbing liquid in a carbon dioxide recovery method according to claim 1, wherein as the amount of heat required for the membrane separation of carbon dioxide by a pervaporation method, a high-temperature gas to be treated that is originally to be treated is introduced as a heat source into the membrane separation apparatus equipped with a zeolite membrane for carbon dioxide separation.

3. The method for regenerating a carbon dioxide absorbing liquid in a carbon dioxide recovery method according to claim 1, wherein before the rich solution that has absorbed carbon dioxide is guided in liquid form to the membrane separation apparatus that is selectively permeable to carbon dioxide, in order to separate moisture contained in the rich solution that has absorbed carbon dioxide from the rich solution absorbing liquid, the rich solution is guided in liquid form to a membrane separation apparatus that is selectively permeable to moisture and equipped with a zeolite membrane for moisture separation, and moisture is separated and removed by a pervaporation method.

4. The method for regenerating a carbon dioxide absorbing liquid in a carbon dioxide recovery method according to claim 3, wherein for the membrane separation of moisture by a pervaporation method, moisture that has permeated to a secondary (permeate) side of the membrane separation apparatus equipped with a zeolite membrane for moisture separation is condensed by a cooling source to depressurize the secondary (permeate) side of the membrane separation apparatus.

5. The method for regenerating a carbon dioxide absorbing liquid in a carbon dioxide recovery method according to claim 4, wherein as the amount of heat required for the membrane separation of moisture by a pervaporation method, a high-temperature gas to be treated that is originally to be treated is introduced as a heat source into the membrane separation apparatus equipped with a zeolite membrane for moisture separation.

6. The method for regenerating a carbon dioxide absorbing liquid in a carbon dioxide recovery method according to claim 5, wherein the membrane separation apparatus is equipped with a flow path for a high-temperature gas to be treated, and a high-temperature gas to be treated that is originally to be treated is received as a heat source in the flow path as the amount of heat required for the membrane separation of carbon dioxide or moisture by a pervaporation method.

7. The method for regenerating a carbon dioxide absorbing liquid in a carbon dioxide recovery method according to claim 3, wherein as the amount of heat required for the membrane separation of moisture by a pervaporation method, a high-temperature gas to be treated that is originally to be treated is introduced as a heat source into the membrane separation apparatus equipped with a zeolite membrane for moisture separation.

8. The method for regenerating a carbon dioxide absorbing liquid in a carbon dioxide recovery method according to claim 7, wherein the membrane separation apparatus is equipped with a flow path for a high-temperature gas to be treated, and a high-temperature gas to be treated that is originally to be treated is received as a heat source in the flow path as the amount of heat required for the membrane separation of carbon dioxide or moisture by a pervaporation method.

9. The method for regenerating a carbon dioxide absorbing liquid in a carbon dioxide recovery method according to claim 1, wherein for the membrane separation of carbon dioxide by a pervaporation method, a secondary (permeate) side of the membrane separation apparatus equipped with a zeolite membrane for carbon dioxide separation is depressurized.

10. The method for regenerating a carbon dioxide absorbing liquid in a carbon dioxide recovery method according to claim 9, wherein as the amount of heat required for the membrane separation of carbon dioxide by a pervaporation method, a high-temperature gas to be treated that is originally to be treated is introduced as a heat source into the membrane separation apparatus equipped with a zeolite membrane for carbon dioxide separation.

* * * * *